(12) United States Patent
Beshiri (10) Patent No.: US 7,931,326 B2
(45) Date of Patent: Apr. 26, 2011

(54) TARP CONNECTOR SYSTEM AND METHOD OF USING SAME

(75) Inventor: Ilir Beshiri, Windsor (CA)

(73) Assignee: Illes Professional Engineering Corporation, Windsor (CA)

( * ) Notice: Subject to any disclaimer, the term of this patent is extended or adjusted under 35 U.S.C. 154(b) by 424 days.

(21) Appl. No.: 12/041,087

(22) Filed: Mar. 3, 2008

(65) Prior Publication Data

US 2008/0217953 A1    Sep. 11, 2008

(30) Foreign Application Priority Data

Mar. 6, 2007   (CA) ...................................... 2581059

(51) Int. Cl.
*B60P 7/02*   (2006.01)
(52) U.S. Cl. ............................... 296/100.18; 296/100.17
(58) Field of Classification Search ............... 296/186.1, 296/186.4, 186.5, 98, 100.12, 100.16, 100.14, 296/100.18, 100.17, 100.11
See application file for complete search history.

(56) References Cited

U.S. PATENT DOCUMENTS

| | | | | |
|---|---|---|---|---|
| 3,363,938 | A * | 1/1968 | Schultz | 296/65.05 |
| 4,902,064 | A | 2/1990 | Tuerk et al. | |
| 5,080,423 | A | 1/1992 | Merlot et al. | |
| 5,538,313 | A | 7/1996 | Henning | |
| 6,293,617 | B1 * | 9/2001 | Sukegawa | 296/203.03 |
| 6,634,697 | B1 * | 10/2003 | Petelka | 296/100.12 |
| 6,976,433 | B1 * | 12/2005 | Neumann | 105/377.03 |
| 7,344,178 | B2 | 3/2008 | Lowry et al. | |
| 2006/0261629 | A1 * | 11/2006 | Lowry et al. | 296/100.12 |
| 2008/0197664 | A1 | 8/2008 | Lowry et al. | |
| 2008/0217953 | A1 * | 9/2008 | Beshiri | 296/100.12 |
| 2009/0072576 | A1 * | 3/2009 | LeBlanc et al. | 296/100.12 |

* cited by examiner

*Primary Examiner* — Glenn Dayoan
*Assistant Examiner* — Gregory Blankenship
(74) *Attorney, Agent, or Firm* — McMillan LLP (57) ABSTRACT

The invention consists of a system for connecting tarps to a vehicle, comprising: a) bows for supporting tarps, the bows comprised of: i) one or more tarp connectors, each of the tarp connectors having a pair of channels for accepting a support pole and ii) one or more corner connectors adapted to receive an end of one of the tarp connectors; b) a plurality of tarps, each tarp secured to the tarp connectors by wrapping the tarp around the support pole and inserting the support pole into the channel of the tarp connector, wherein the bows are combined with the tarps to create an enclosed cargo area for the vehicle.

8 Claims, 8 Drawing Sheets

TARP CONNECTOR SYSTEM AND METHOD OF USING SAME

FIELD OF THE INVENTION

The present invention relates to the field of tarps for covering vehicle beds. In particular, it relates to connectors used for securing the tarps to the vehicle.

BACKGROUND OF THE INVENTION

Shipping of goods, both regionally and internationally, is conducted by several means, including rail, ship and, very often, truck. While container trucks or truck-trailer combinations are used, particularly in conjunction with rail or ship container shipping, in many places and situations, a standard flatbed truck is used. In order to protect the shipped goods from exposure to the elements, they are typically covered with tarps. In order to ensure optimal shipping conditions, a system of securing the tarps to the flatbed is required. Generally, a series of frames (known as "bows") are attached to the flatbed and then one or more tarps are attached to the bows to create an enclosed, roughly cuboid cargo area. The most common currently known means of securing the tarps to the bows involves flaps on the tarp which overlap the bow, generally using Velcro™ or similar means. The tarp is required to be modified to include the flaps, and after repeated use the flaps do not secure as well, suggesting a need for an improved method of securing the tarps.

U.S. Pat. No. 4,902,064 issued to Tuerk et al. discloses a Conestoga-style tarp system using bows which are attached to guide rails attached to the sides of the vehicle flatbed. The rearmost bow is designed to be tilted or leaned to provide tension to the tarp and to secure the bow. The tarp is a single tarp which is extended over the bows and supported by the tension created by the positioning of the rearmost bow. The Tuerk tarp system does not disclose any use of multiple tarps, nor any means of securing the tarp to the individual bows.

U.S. Pat. No. 5,538,313 issued to Henning discloses a tarp system for a flatbed trailer including three sets of bow members (front, intermediate, rear) for supporting the tarp. The bow members are slidably mounted to guide rails running along the sides of the flatbed, thus enabling the bow members to be moved to different locations on the flatbed and for the entire assembly to be compressed or expanded as required to load and unload the vehicle. Henning is a modified version of the Tuerk system and is similarly design around a single tarp supported by tension created by bow positioning. There is no disclosure of any system using multiple tarps or any means of securing the tarps to individual bows.

U.S. Pat. No. 5,080,423 issued to Merlot et al. discloses a segmented tarp cover system. The Merlot tarp is designed as a series of segmented tarp pieces which are extended to cover the top of a cargo container, such as a rail car of truck trailer. The Merlot system is designed solely for a top covering and does not disclose any means or method of covering the sides and ends of a cargo container or surface.

All the disclosed systems require the addition of guide rails or an equivalent element to the flatbed to support the bows. Not all flatbeds are capable of having guide rails secured to them, not is it desirable in all circumstances to have guide rails secured to the flatbed. The addition of guide rails either increases the width of the flatbed, risking violation of regulations or takes away available cargo space from the flatbed, making it less efficient.

Even when the installation of the guide rails and bows is monitored to ensure compliance with width regulations, it is still common to have the tarp attachment means (flaps, buckles, etc.) on the exterior. These means may then extend beyond the legal width permitted for the cargo bed, and the driver/operator may not even be aware of the violation. Thus, there is a need for a tarp connector system without external tarp attachment means to ensure compliance with legal restrictions on vehicle width.

The above patents are illustrative of the limitations in the known art. In addition to the above-noted limitations, the corners of the bow protrude into the interior of the cargo area, reducing the amount of available space and imposing restrictions on loading. Similarly, the tarp attachments protrude into the interior, affecting the cargo capability in the same way as the bow corners. Alternatively, they are exposed on the exterior, making them vulnerable to the elements or to theft and vandalism, and at risk of coming detached and exposing the cargo. There is a need in the tarp and trucking industry to address these limitations.

It is an object of this invention to partially or completely fulfill one or more of the above-mentioned needs.

SUMMARY OF THE INVENTION

The invention consists of a system for connecting tarps to a vehicle, comprising: a) bows for supporting tarps, the bows comprised of: i) one or more tarp connectors, each of the tarp connectors having a pair of channels for accepting a support pole and ii) one or more corner connectors adapted to receive an end of one of the tarp connectors; b) a plurality of tarps, each tarp secured to the tarp connectors by wrapping the tarp around the support pole and inserting the support pole into the channel of the tarp connector, wherein the bows are combined with the tarps to create an enclosed cargo area for the vehicle.

The invention further includes a method of connecting tarps to a vehicle, comprising: a) attaching bows to a vehicle, the bows comprised of: i) one or more tarp connectors, each of the tarp connectors having a pair of channels for accepting a support pole and ii) one or more corner connectors adapted to receive an end of one of the tarp connectors; b) wrapping the tarps around the support poles, and c) inserting the support poles into the tarp connectors to create a cargo area for the vehicle enclosed by the tarps.

Preferably, the tarp connectors are detachably removable from the corner connectors.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 7:
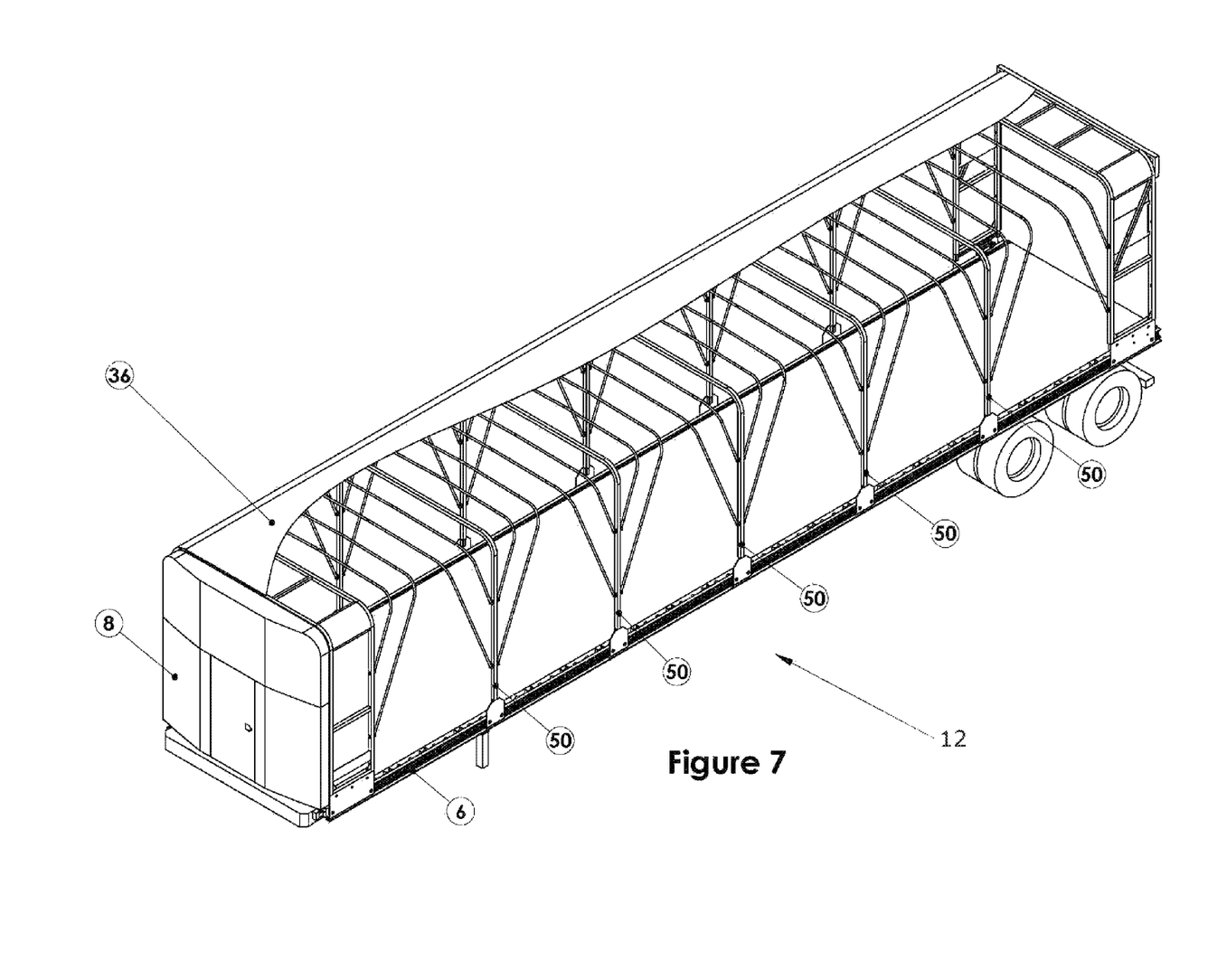

A presently preferred embodiment of the inventive system presented herein consists of a system for securing tarps based on bows created by a combination of tarp connectors and corner connectors. Preferably, the system may be used for securing tarps to a vehicle 8, as shown in FIG. 7.

Figure 1:
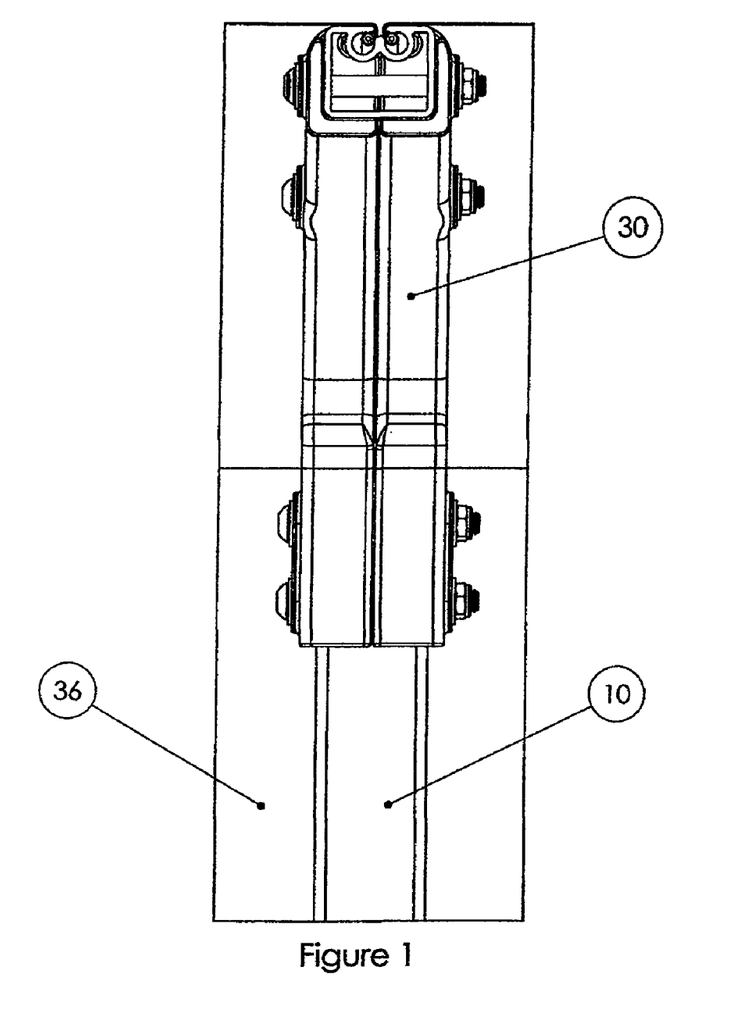
FIG. 1 is a front view of a tarp connector element with connected tarps according to the present invention.
Figure 2:
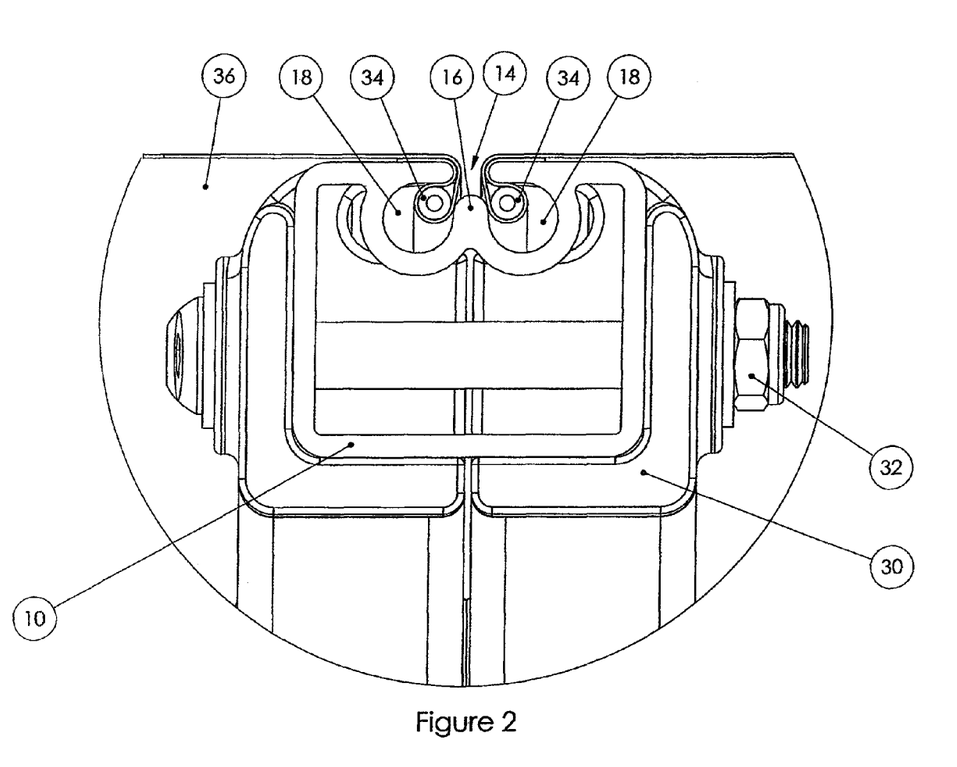
FIG. 2 is a close-up view of the circled region of FIG. 1

The tarp connector 10 is shown in FIG. 1 and in close-up in FIG. 2. The tarp connector 10 comprises a frame creating an enclosure 12 (shown in FIG. 7). A tarp support element 16 is formed in the frame on the inside of the enclosure 12 and provides a pair of channels 18. A gap 14 in the frame allows the tarps 36 to enter and exit the channels 18. By locating the tarp support element 16 within the frame of the tarp connector 10, there are no external protrusions that create a risk of exceeding width restrictions. Similarly, there are no internal protrusions that interfere with cargo loading and available cargo space. Finally, there are no protrusions, either internal or external which would be vulnerable to damage during cargo loading or shifting, or vulnerable to vandalism or sabotage.

In use, an end or section of the tarp 36 is wrapped around a pole 34, preferably made of plastic, and the pole 34 is inserted into the pole channel 18. The gap 14 is dimensioned such that the pole 34 cannot pass through the gap 14, yet the tarp 36 is capable of passing through the gap. The use of the poles 34 eliminates the need for modifications to the tarp 36 to secure the tarp 36 to the connector 10. The overall structure is also more secure, as a larger section of the tarp 36 is secured to the connector 10 than with conventionally known methods.

Figure 3:
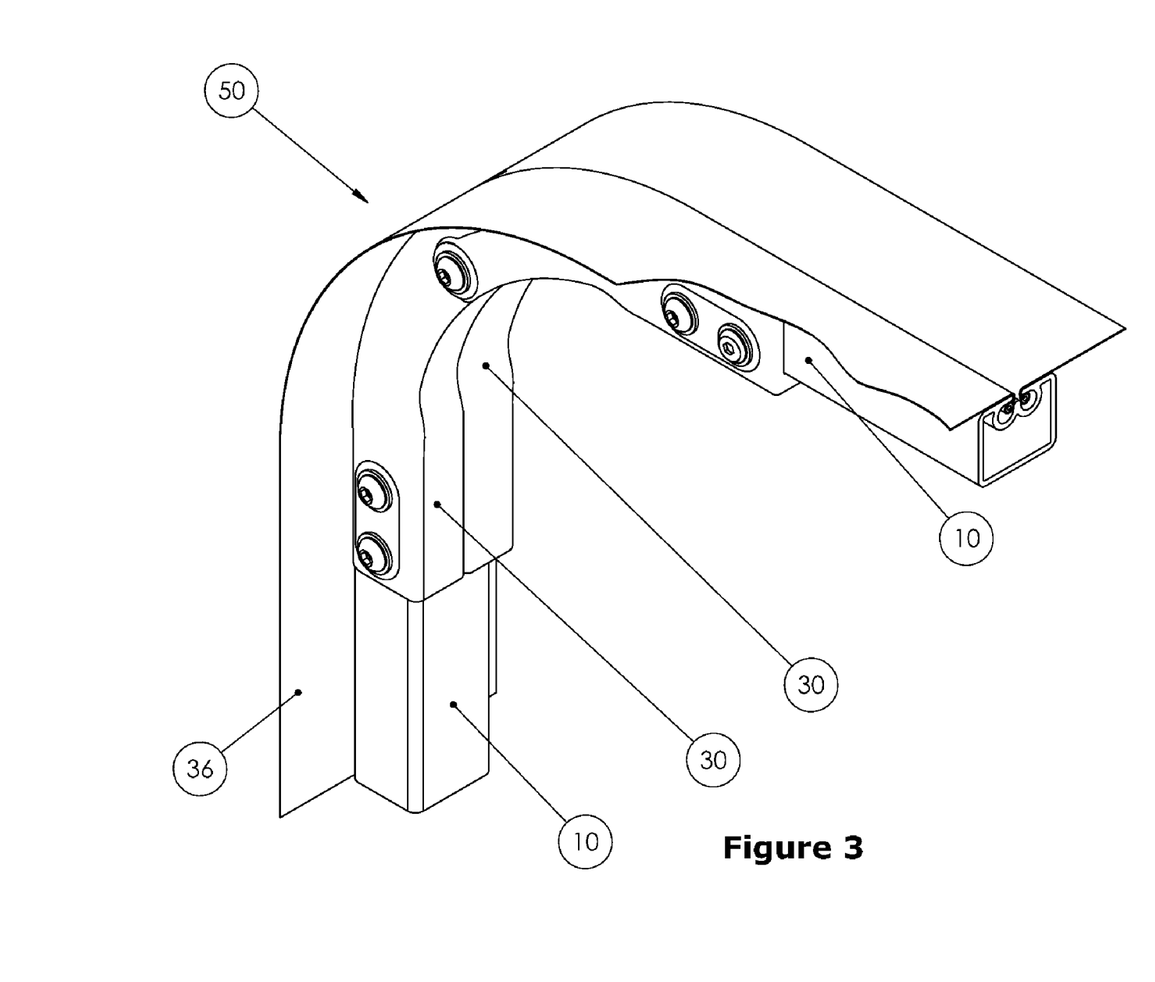
FIG. 3 is a perspective view of a coupled corner connector and tarp connector.
Figure 4:
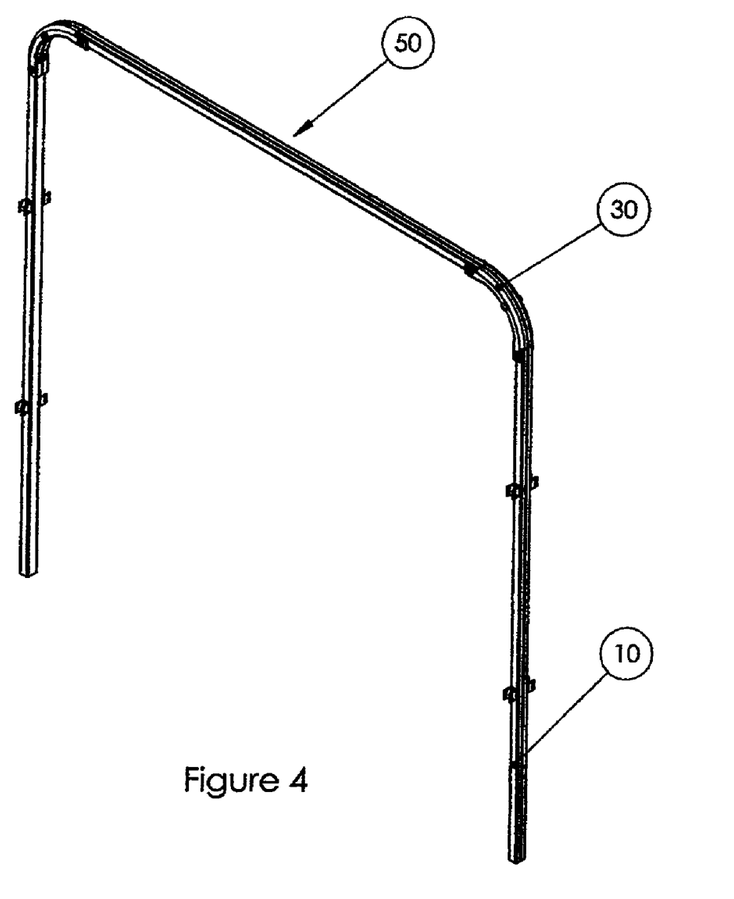
FIG. 4 is a perspective view of a complete bow using the corner connector and tarp connector of the present invention.

At the corners, the tarp connector 10 is coupled to the corner connector 30, as shown in FIG. 3, to create a bow 50, as shown in FIG. 4, to support the tarps and create an enclosed cargo area. When connected with the corner connector 30, the tarp connector 10 has the gap 14 facing the exterior of the cargo area, leaving the maximum amount of available cargo space covered by tarps 36.

Figure 5:
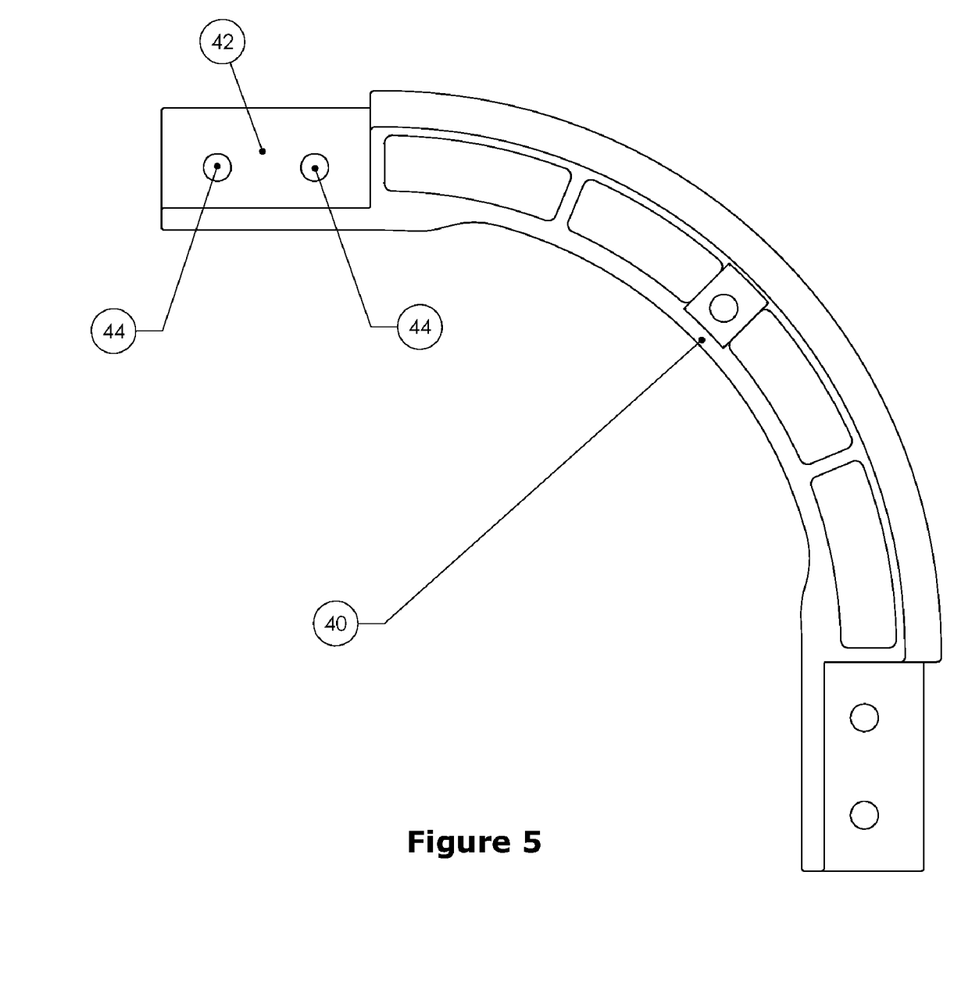
FIG. 5 is a side view of one piece of a corner connector.

The corner connectors 30 are formed from two separate pieces 40, as shown in FIG. 5, which are joined together to form a single corner connector 30. Each piece has a notched end 42, which combines with the notched end 42 of the adjoining piece 40 to create a slot for attachment of the tarp connector 10. In the preferred embodiment shown, a hole 44 is provided for use in securing the tarp connector 10 to the corner connector 30, preferably using a nut-and-bolt combination 32.

Figure 6:
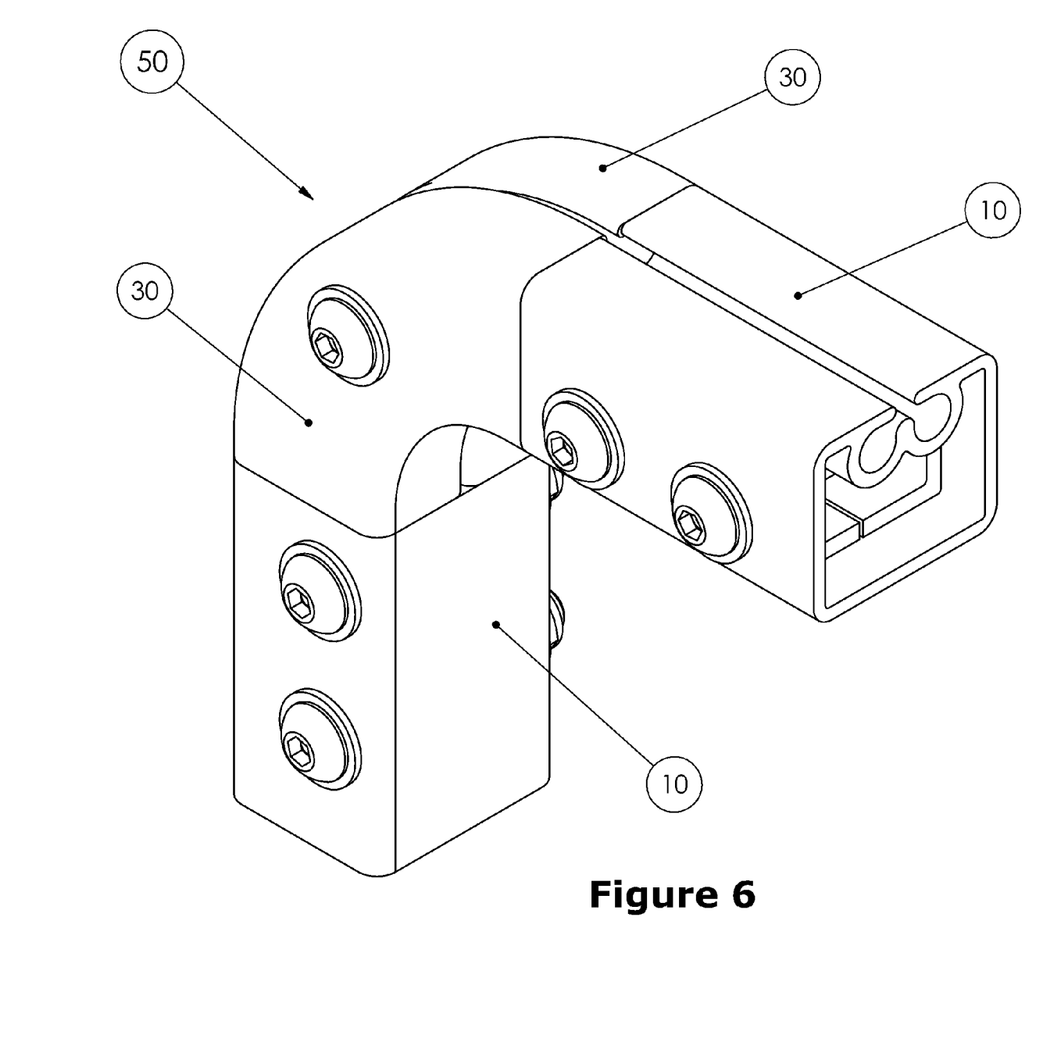
FIG. 6 is a perspective view of an alternate version of a coupled corner connector and tarp connector; and, FIG. 7 is a perspective view of the tarp connector system according to the present invention.
Figure 8:
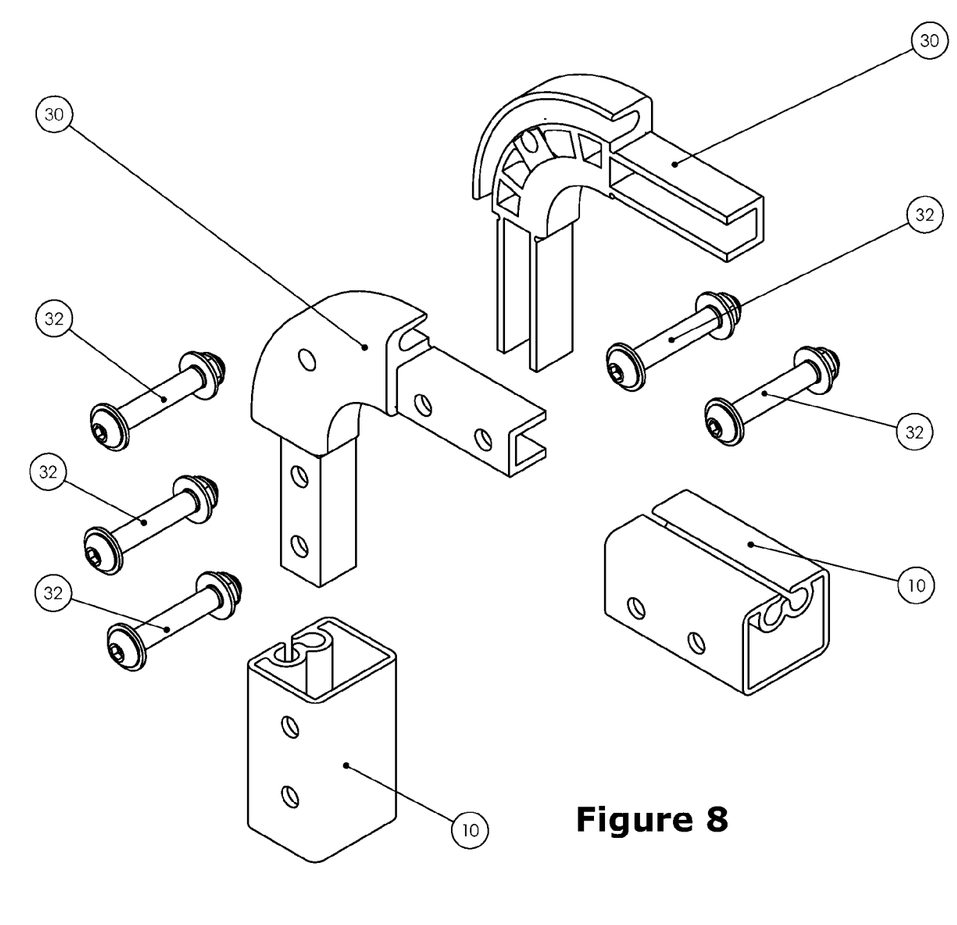
FIG. 8 is an exploded view of the coupled corner connector of FIG. 6.

The connection between the corner connectors 30 and the tarp connectors 10 can be such that the corner connectors 30 are located on the outside, as shown in FIG. 3, or such that the corner connectors 30 are located on the inside, as shown in FIG. 6 and FIG. 8. The relative location of the corner connectors 30 to the tarp connectors 10 is not generally of significance, although all connectors 10, 30 used on the same bow 50 should connect in the same manner.

The resulting bows 50 provide a maximum amount of interior space, with creating any external elements that could be tampered with or otherwise damaged. The bows 50 are particularly useful for cargo shipments, such as lumber, which require no obstructions inside the cargo space to allow for optimal loading of cargo and maximum usage of space.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A system for connecting tarps to a vehicle, comprising:
    a) bows for supporting tarps, the bows comprised of:
        i) one or more tarp connectors, each of the tarp connectors having a pair of channels for accepting a support pole, and
        ii) one or more corner connectors adapted to couple with an end of one of the tarp connectors;
    b) a plurality of tarps, each tarp secured to the tarp connectors by securing the tarp around the support pole and inserting the support pole into the channel of the tarp connector,
    wherein the bows are combined with the tarps to create an enclosed cargo area for the vehicle,
    and wherein an end of the corner connector fits within the end of the tarp connector.

2. The system of claim 1, wherein the pair of channels are located on the interior of the tarp connector, such that there are no external protrusions from the tarp connector.

3. The system of claim 1, wherein the tarp connectors are detachably removable from the corner connectors.

4. The system of claim 3, wherein the end of the tarp connector fits within an end of the corner connector.

5. The system of claim 2, wherein the tarp connectors are detachably removable from the corner connectors.

6. The system of claim 5, wherein the end of the tarp connector fits within an end of the corner connector.

7. A method of connecting tarps to a vehicle, comprising:
    a) attaching bows to a vehicle, the bows comprised of:
        i) one or more tarp connectors, each of the tarp connectors having a pair of channels for accepting a support pole and
        ii) one or more corner connectors adapted to receive an end of one of the tarp connectors; and wherein an end of the one or more corner connectors is adapted to fit within the end of the tarp connector;
    b) securing the tarps around the support poles, and
    c) inserting the support poles with the secured tarps into the tarp connectors to create a cargo area for the vehicle enclosed by the tarps.

8. The method of claim 7, further comprising locating the pair of channels on the interior of the tarp connector, such that there are no external protrusions from the tarp connector.

* * * * *